United States Patent

[11] 3,585,496

[72] Inventor Bunjiro Ichijo
Hamamatsu-shi, Japan
[21] Appl. No. 788,422
[22] Filed Jan. 2, 1969
[45] Patented June 15, 1971
[73] Assignee Tsugami Mfg. Co., Ltd.
Tokyo, Japan
[32] Priority Jan. 5, 1968
[33] Japan
[31] 43/482

[54] DIELECTRIC LOSS MEASURING APPARATUS EMPLOYING PLURAL TUNED CIRCUITS
8 Claims, 8 Drawing Figs.

[52] U.S. Cl. .......... 324/60, 324/57
[51] Int. Cl. .......... G01r 27/26, G01r 27/00
[50] Field of Search .......... 324/60, 61, 57, 60 B, 60 C, 60 CD

[56] References Cited

UNITED STATES PATENTS

| | | | |
|---|---|---|---|
| 2,329,098 | 9/1943 | Browning et al. .......... | 324/57 X |
| 2,906,950 | 9/1959 | Ichijo .......... | 324/61 X |

*Primary Examiner*—Rudolph V. Rolinec
*Assistant Examiner*—Ernest F. Karlsen
*Attorney*—Hall, Pollock & Vande Sande

ABSTRACT: An apparatus for the precise measurement of very low dielectric losses of a dielectric specimen at high frequencies having a high frequency oscillator, a series tuning circuit electromagnetically coupled to the coil in a tank circuit of the high frequency oscillator and having two series-connected variable air capacitors, two tuning circuits electrostatically coupled to the series tuning circuit, and a detecting circuit having an indicating meter and inductively coupled to the parallel tuning circuits. A dielectric specimen is connected to one of the parallel tuning circuits and the zero method is utilized to measure the loss resistance of the specimen.

BUNJIRO ICHIJO INVENTOR

BY Hall, Pollock & Vande Sande
ATTORNEY

FIG. 4a
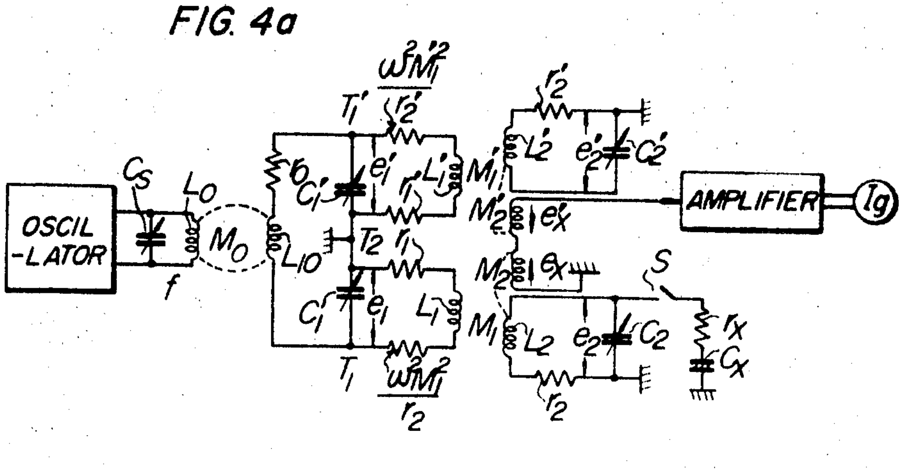
FIG. 4b FIG. 4c
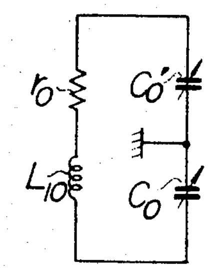
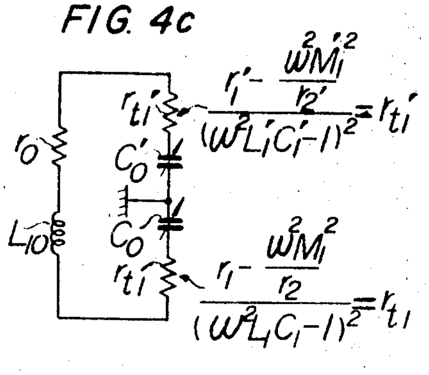
BUNJIRO ICHIJO INVENTOR
BY Hall, Pollock & Vande Sande
ATTORNEY

DIELECTRIC LOSS MEASURING APPARATUS EMPLOYING PLURAL TUNED CIRCUITS

This invention relates to electrical measuring apparatus and more particularly to an apparatus for the precise measurement of electrical losses of dielectric materials.

Precise measurement of very low resistances, very high resistances and very low dielectric losses of various dielectric materials at high frequencies is increasingly required with the advance in dielectric materials for use in electrical engineering.

It is a primary object of the present invention to provide a novel and improved apparatus which satisfies the above demand.

The above and other objects, features and advantages of the present invention will be apparent from the following description when read in conjunction with the accompanying drawings, in which.

Figures 3A, 3B, 3C:
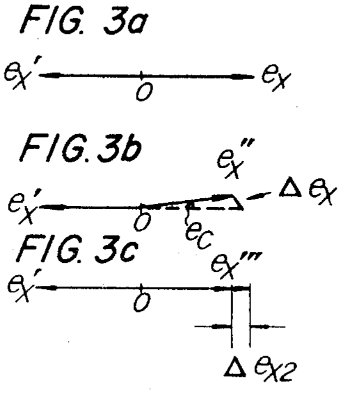

FIGS. 3*a*, 3*b* and 3*c* are vector diagrams of voltages appearing in the detecting circuit;

FIG. 4*a* is a circuit diagram of another embodiment of the present invention which is adapted to measure a very low dielectric loss at high frequencies by means of an inductive coupling system; and FIGS. 4*b* and 4*c* are equivalent circuit diagrams of the loss measuring section in the embodiment shown in FIG. 4*a*.

Figures 1, 2:
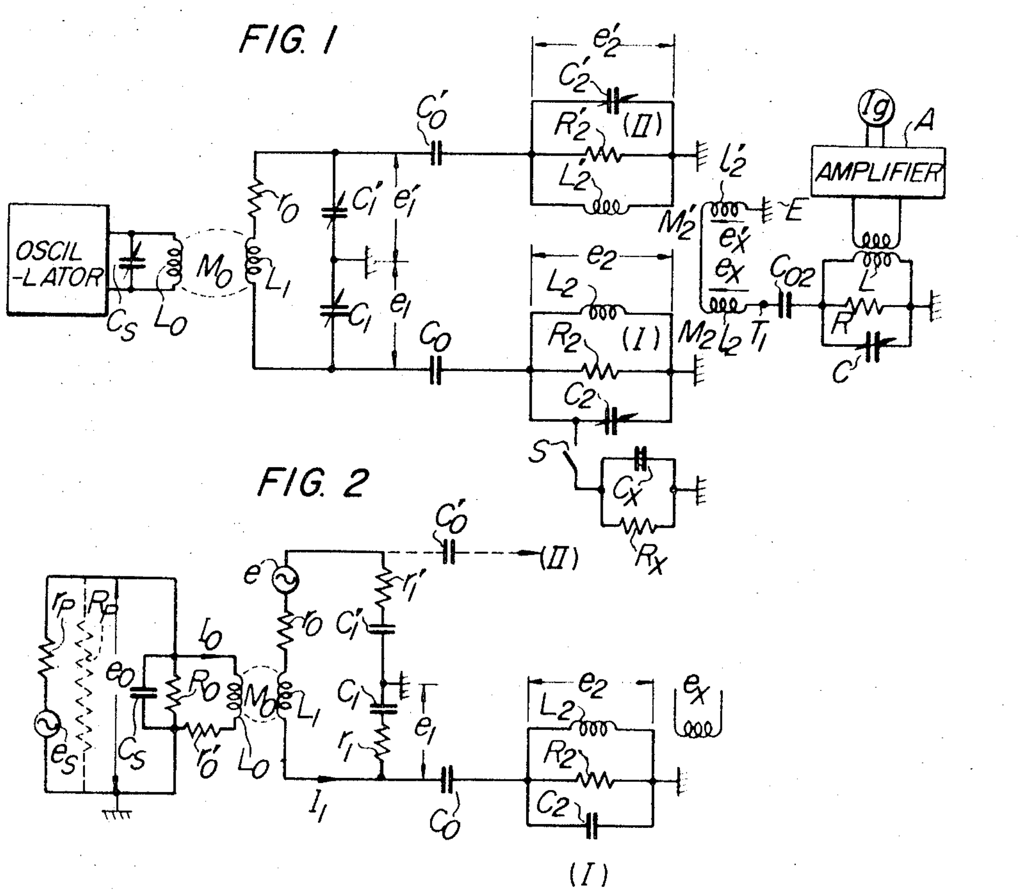
FIG. 1 is a circuit diagram of the electrical measuring apparatus of the present invention which is adapted to measure a very low dielectric loss at high frequencies by means of an electrostatic coupling system.
FIG. 2 is a circuit diagram showing details of part of the circuit diagram shown in FIG. 1.

Referring to FIG. 1, a high frequency oscillator OSC is stabilized in its high frequency output and is associated with a tank circuit including a capacitance $C_s$ and an inductance $L_0$. A coil having an inductance $L_1$ is inductively coupled to the inductance $L_0$ with a coefficient of magnetic induction $M_0$. The inductance $L_1$ and capacitances $C_1$ and $C_1'$ form a series tuning circuit so as to measure an equivalent parallel resistance $R_x$ of a specimen from a minute change $\Delta C_1$ in $C_1$ or a minute change $\Delta C_1'$ in $C_1'$. The inductance $L_0$ has a resistance $r_0$ and the relation therebetween can be expressed as $\omega L_1/r_0=Q_1$. Suppose now that $C_1=C_1'$, then the circuit comprising $L_1$, $C_1$ and $C_1'$ is tuned when the relation $$\omega^2 L_1 C_1 = 2 \quad (1)$$

holds, and the voltage appearing across $C_1$ becomes maximum. Variable air capacitors having the capacitances $C_1$ and $C_1'$ have their rotor sides grounded in common and are electrostatically coupled to parallel tuning circuits I and II at their high voltage terminals through very small capacitances $C_0$ and $C_0'$ of equal value, respectively. Coils having inductances $L_2$ and $L_2'$ in the tuning circuits I and II are electromagnetically coupled to coils having inductances $l_2$ and $l_2'$ in a detecting circuit with coefficients of mutual induction $M_2$ and $M_2'$ of equal value, respectively.

These two tuning circuits I and II are identical in their construction and circuit constants. Thus, $L_2=L_2'$, $R_2=R_2'$ and $C_2=C_2'$. When the series tuning circuit is tuned under the condition of $C_1=C_1'$, terminal voltages $e_1$ and $e_1'$ are of the same magnitude or $e_1=e_1'$. Because of the fact that $C_0=C_0'$, maximum voltages appear across the two tuning circuits I and II when the following conditions are satisfied:

$$\omega^2 L_2(C_2+C_0)=1, \qquad \omega^2 L_2'(C_2'+C_0')=1 \quad (2)$$

The magnitudes of the maximum voltages are given by $$e_2=j\omega C_0 R_2 e_1, \qquad e_2'=j\omega C_0' R_2' e_1' \quad (3)$$

In this case, $e_2=e_2'$. Therefore, voltages $e_x$ and $e_x'$ induced across the inductances $l_2$ and $l_2'$ are of the same magnitude or $e_x=e_x'$, and the deflection of an indicating meter $I_g$ is zero.

In the detecting circuit, a combination of a capacitance $C_{02}$, an inductance $L$ and a capacitance C is provided in order to amplify a minute difference $\Delta e_x$ between $e_x$ and $e_x'$, the minute difference being then amplified by an amplifier A for deflecting the indicating meter $I_g$ accordingly. In the state in which the circuits are in complete equilibrium and $I_g=0$, the inputs $e_x$ and $e_x'$ to the detecting circuit have a vector relationship as shown in FIG. 3*a*. Then when a switch S is closed to connect a dielectric specimen (having a capacitance $C_x$ and equivalent parallel resistance $R_x$) to the circuit I, $e_x$ will now be changed into $e_x'$, in FIG. 3*b* due to the presence of $C_x$ and $R_x$, and an output $\Delta e_{x1}$ appears across a terminal $T_1$ and the ground E to cause a deflection of the indicating meter $I_g$. Then, the value of $C_2$ may be reduced to minimize the deflection of the meter $I_g$. In this case, $e_x$ will have a vector as shown in FIG. 3*c* and the value of $C_x$ can be obtained from the value of $C_2$. The deflection of the indicating meter $I_g$ in such a case is caused by $\Delta e_{x2}$ which is dependent upon the resistance loss $R_x$ of the specimen.

Referring next to FIG. 2, a method of seeking $R_x$ from $C_1$ will be described. In the equivalent circuit of the high-frequency oscillator, the high-frequency source generating a high-frequency voltage $e_s$ comprises a vacuum tube circuit having an internal resistance $r_p$. The relation between the internal resistance $r_p$ and an equivalent parallel resistance $R_0$ of the tank circuit including $L_0$ and $C_s$ is $R_0 \gg r_p$. Now, the voltage $e_2$ appearing across the tuning circuit I under the conditions of $$\omega^2 L_1 C_1 = 2 \quad (4)$$

$$\omega^2 L_2(C_2+C_0)=1 \quad (5)$$

and $$C_1=C_1'$$

will be sought in FIG. 2. Under the conditions that the circuits I and II are coupled to the series tuning circuit including $L_1$, $C_1$ and $C_1'$ through $C_0$ and $C_0'$, and under the condition that the equation (5) is satisfied, series resistances $r_1$ and $r_1'$ in the series tuning circuit can be given by the following equations:

$$r1=\frac{C_0^2}{C_1^2}R_2$$

$$r_{1'}=\frac{C_{0'}^2}{C_{1'}^2}R_{2'}$$

hence, $$r1+r1'=\frac{C_0^2}{C_1^2}R_2+\frac{C_{0'}^2}{C_{1'}^2}R_{2'} \quad (6)$$

Therefore, a resistance $r_{0'}$ in series with $L_0$ is given by $$r_{0'}=\frac{\omega^2 M_0^2}{r_0+\frac{C_0^2}{C_1^2}R_2+\frac{C_{0'}^2}{C_{1'}^2}R_{2'}} \quad (7)$$

From the relation $$R_p=\frac{\omega^2 L_0^2}{r_{0'}},$$

$R_p$ can be given by $$R_p=\frac{L_0^2}{M_0^2}\left(r_0+\frac{C_0^2}{C_1^2}R_2+\frac{C_{0'}^2}{C_{1'}^2}R_{2'}\right) \quad (8)$$

Thus, $$e_0=e_s x\frac{1}{1+r_p/R_p}=e_s x\frac{L_0^2\left(r_0+\frac{C_0^2}{C_1^2}R_2+\frac{C_{0'}^2}{C_{1'}^2}R_{2'}\right)}{L_0^2\left(r_0+\frac{C_0^2}{C_1^2}R_2+\frac{C_{0'}^2}{C_{1'}^2}R2'\right)+M_0^2 r_p} \quad (9)$$

$$I_0=\frac{e_0}{\omega L_0}$$

(provided that $\omega L_0 \gg r_0$)

$$e=\omega M_0 I_0$$

$$I_1=\frac{e}{r_0+\frac{C_0^2}{C_1^2}R_2+\frac{C_{0'}^2}{C_{1'}^2}R_{2'}}$$

$$e_1=\frac{I_1}{\omega C_1}$$

(provided that $\omega C_1 r_1 \ll 1$)

and from $/e_2/=\omega C_0 R_2 e_1$, $e_2$ is given by $$e_2=\frac{C_0}{C_1}x\frac{M_0L_0R_2e_s}{L_0^2\left(r_0+\frac{C_0^2}{C_1^2}R_2+\frac{C_{0'}^2}{C_{1'}^2}R_{2'}\right)+M_0^2r_p} \qquad (10)$$

Similarly, $e_{2'}$ is given by $$e_{2'}=\frac{C_{0'}}{C_{1'}}x\frac{M_0L_0R_{2'}e_s}{L_0^2\left(r_0+\frac{C_0^2}{C_1^2}R_2+\frac{C_{0'}^2}{C_{1'}^2}R_{2'}\right)+M_0^2r_p} \qquad (11)$$

The outputs or sensitivity losses due to a minute change of $R_2$ are given by $$\Delta e_2=\frac{C_0}{C_1}xM_0L_0e_sR_2\frac{L_0^2\left(r_0+\frac{C_{0'}^2}{C_{1'}^2}R_{2'}\right)+M_0^2r_p}{\left\{L_0^2\left(r_0+\frac{C_0^2}{C_1^2}R_2+\frac{C_{0'}^2}{C_{1'}^2}R_{2'}\right)+M_0^2r_p\right\}^2}x\frac{\Delta R_2}{R_2}$$

$$\Delta e_{2'}=-\frac{C_{0'}}{C_{1'}}xM_0L_0e_sR_{2'}x\frac{L_0^2\frac{C_0^2}{C_1^2}R_2}{\left\{L_0^2\left(r_0+\frac{C_0^2}{C_1^2}R_2+\frac{C_{0'}^2}{C_{1'}^2}R_{2'}\right)+M_0^2r_p\right\}^2}x\frac{\Delta R_2}{R_2}$$

Suppose that $\Delta e$ is the difference between the voltages across the circuits I and II, then $\Delta e=\Delta e_2-e_2'$.

Because of the fact that $C_0=C_0'$, $C_1'$ and $R_2=R_2'$, $\Delta e_2$ is given by $$\Delta e_2=\frac{C_0}{C_1}\times\frac{M_0L_0R_2e_s}{L_0^2\left(r_0+\frac{2C_0^2}{C_1^2}R_2\right)+M_0^2r_p}\times\frac{\Delta R_2}{R_2} \qquad (12)$$

Voltages $e_2$ and $e_2'$ appearing as a result of minute change $\Delta R_2$ in $R_2$ or $R_2 \rightarrow R_2+\Delta R_2$ will now be sought from the Equations (10) and (11) as follows:

$$e_2=\frac{C_0}{C_1}\times\frac{M_0L_0(R+\Delta R_2)e_s}{L_0^2\left\{r_0+\frac{C_0^2}{C_1^2}(R_2+\Delta R_2)+\frac{C_{0'}^2}{C_{1'}^2}R_{2'}\right\}+M_0^2r_p} \qquad (10')$$

$$e_{2'}=\frac{C_{0'}}{C_{1'}}\times\frac{M_0L_0R_{2'}e_s}{L_0^2\left\{r_0+\frac{C_0^2}{C_1^2}(R_2+\Delta R_2)+\frac{C_{0'}^2}{C_{1'}^2}R_{2'}\right\}+M_0^2r_p} \qquad (11')$$

The actual output is the difference between $e_2$ and $e_2'$ in the equations (10') and (11') and acts to deflect the indicating meter. Suppose that $C_1$ is increased by a minute amount $\Delta C_1$ so that the deflection becomes zero again. The voltages $e_2$ and $e_2'$ when $C_1$ is increased to $C_1+\Delta C_1$ are obtained from the equations (10') and (11'), and the difference therebetween is assumed to be zero or $e_2-e_2'=0$. Then, the denominators of the equations (10') and (11') are entirely identical with each other and are given by $$L_0^2\left\{r_0+\frac{C_0^2}{(C_1+\Delta C_1)^2}(R_2+\Delta R_2)+\frac{C_{0'}^2}{C_{1'}^2}R_{2'}\right\}+M_0^2r_p$$

which may be expressed herein as A.

Thus, $$\frac{C_0}{C_1+\Delta C_1}\times\frac{M_0L_0R_2e_s}{A}+\frac{C_0}{C_1+\Delta C_1}\times\frac{M_0L_0R_2e_s}{A}\times\frac{\Delta R_2}{R_2}-\frac{C_{0'}}{C_{1'}}\times\frac{M_0L_0R_{2'}e_s}{A}=0$$

$$\frac{C_0}{C_1}\left(1-\frac{\Delta C_1}{C_1}\right)\times\frac{M_0L_0R_2e_s}{A}+\frac{C_0}{C_1}\left(1-\frac{\Delta C_1}{C_1}\right)\times\frac{M_0L_0R_2e_s}{A}\times\frac{\Delta R_2}{R_2}-\frac{C_{0'}}{C_{1'}}\times M_0L_0R_{2'}e_s=0$$

Since $C_0=C_0'$, $C_1=C_1'$ and $R_2=R_2'$, the above equation can be expressed as $$-\frac{C_0}{C_1}\times\frac{M_0L_0R_2e_s}{A}\times\frac{\Delta C_1}{C_1}+\frac{C_0}{C_1}\times\frac{M_0L_0R_2e_s}{A}\times\frac{\Delta R_2}{R_2}-\frac{C_0}{C_1}\times\frac{M_0L_0R_2e_s}{A}\times\frac{\Delta R_2}{R_2}\times\frac{\Delta C_1}{C_1}=0$$

The above equation can be simplified as $$\frac{\Delta C_1}{C_1}=\frac{\Delta R_2}{R_2} \qquad (13)$$

because the third member of the equation is negligible compared with the first and second members. On the other hand, the relation $$\frac{\Delta R_2}{R_2}=\frac{R_2}{R_x}$$

holds when $R_x >> R_2$, and finally the following equation is obtained:

$$\frac{\Delta C_1}{C_1}=\frac{R_2}{R_x} \qquad (14)$$

Since $C_1$ and $R_2$ in the equation (14) are known values, $R_x$ can be obtained from the value of a minute change $\Delta C_1$ in $C_1$ when the output due to the presence of $R_x$ is made zero by varying the value of $C_1$.

In another embodiment shown in FIG. 4*a*, the apparatus comprises a power supply regulating section and a measuring section which are electromagnetically coupled to each other. The power supply regulating section includes variable air capacitors having capacitances $C_1$ and $C_1'$. Coils having inductances $L_1$ and $L_1'$ are connected in parallel with the respective capacitors. The coils have respective resistances $r_1$ and $r_1'$. The magnitudes of the inductances $L_1$ and $L_1'$ are selected so as to satisfy the conditions $\omega^2L_1C_1>1$ and $\omega^2L_1'C_1'>1$, respectively. Suppose that $C_1=C_0$, $C_1'=C_0'$ and $C_0=C_0'$ when the circuit including $L_{10}$ $C_1$ and $C_1'$ is tuned with a power source frequency $f$ in the state in which $L_1$ and $L_1'$ are not connected. In this case, voltages appearing across $C_1$ and $C_1'$ are maximum under the condition $$\omega^2L_{10}\frac{C_0}{2}=1.$$

Then when the inductances $L_1$ and $L_1'$ are connected, the circuits are tuned under the conditions $$C_1=C_0+\frac{1}{\omega^2L_1},\ C_{1'}=C_{0'}+\frac{1}{\omega^2L_{1'}} \qquad (15)$$

and voltages $e_1$ and $e_1'$ become maximum. Under the above condition, capacitances $C_2$ and $C_2'$ in the measuring section are regulated to attain the tuning of tuning circuits in the measuring section. Thus, voltages $e_2$ and $e_2'$, hence voltages $e_x$ and $e_x'$ appearing in a detecting circuit take their maximum values. The deflection of an output indicating meter $I_0$ is zero when $e_x=e_x'$.

The impedance $Z$ between terminals $T_1$ and $T_2$ in the power supply regulating section is given by $$Z=\frac{\omega L_1}{(\omega^2L_1C_1-1)^2}\sqrt{\frac{r_{t1}^2}{\omega^2L_1^2}+(\omega^2L_1C_1-1)^2} \qquad (16)$$

wherein $$r_{t1}=\frac{r_1+\frac{\omega^2M_1^2}{r_2}}{(\omega^2L_1C_1-1)^2}$$

Neglecting the first member under the root symbol since it is negligible compared with the second member, $Z$ can be expressed as $$Z=\frac{\omega L_1}{\omega^2L_1C_1-1} \qquad (17)$$

From the Equation (17), the following equation can be obtained:

$$\frac{\Delta Z}{Z}=\frac{\omega_2 L_1 C_1}{\omega^2 L_1 C_1-1}\cdot\frac{\Delta C_1}{C_1}$$

By inserting the above relation into the Equation (15), we obtain the following equation $$\frac{\Delta Z}{Z}=\frac{\Delta C_1}{C_0} \qquad (18)$$

Thus, a minute change $\Delta e_1$ in $e_1$ across the terminals $T_1$ and $T_2$ due to $\Delta C_1$ is given by $$\frac{\Delta e_1}{e_1}=\frac{\Delta Z_1}{Z_1}=\frac{\Delta C_1}{C_0} \qquad (19)$$

On the other hand, the output voltages $e_2$ and $e_{2'}$ from the measuring section when both the power supply regulating section and the measuring section in Fig. 4a are in their tuned state are given by the following equations:

$$e_2=\frac{\omega M_2}{\omega^2 L_1 C_0}\times\frac{\omega L_2}{r_2}\times A \qquad (20)$$

$$e_{2'}=\frac{\omega M_{1'}}{\omega^2 L_{2'} C_{0'}}\times\frac{\omega L_{2'}}{r_{2'}}\times A \qquad (21)$$

wherein $$A=\frac{M_0 L_0 e_a(\omega^2 L_1 C_1-1)^2(\omega^2 L_{1'} C_{1'}-1)^2}{L_0^2[r_0(\omega^2 L_1 C_1-1)^2(\omega^2 L_{1'} C_{1'}-1)^2+r_1(\omega^2 L_{1'} C_{1'}-1)^2+*}$$

$$*\frac{\omega^2 M_1^2}{r_2}(\omega^2 L_{1'} C_{1'}-1)^2+r_{1'}(\omega^2 L_1 C_1-1)^2+*$$

$$*\frac{\omega^2 M_{1'}^2}{r'}(\omega^2 L_1 C_1-1)^2+M_0^2 r_D(\omega^2 L_1 C_1-1)^2(\omega^2 L_{1'} C_{1'}-1)^2]$$

The voltages $e_x$ and $e_x'$ in the detecting circuit are equal to each other when $e_2$ and $e_2'$ are of the same magnitude, and the output indicating meter indicates zero point.

When now a switch $S$ in FIG. 4a is closed to connect a specimen to the measuring circuit, $r_2$ in the measuring circuit increases very slightly by $\Delta r_2$ due to $r_x$ of the specimen. Tuning for $C_x$ may be attained by varying the value of $C_2$ to $C_2'$. Thus, $C_x=C_2-C_2'$. Because of the fact that $r_2$ is varied to $r_2+\Delta r_2$, an output is developed to deflect the output indicating meter. The capacitance $C_0$ is very slightly reduced by an amount $\Delta C_1$ to reduce the output to zero again. Then, from the equations (20) and (21), we obtain $$e_2=\frac{\omega M_1}{\omega^2 L_1(C_0-\Delta C_1)}\times\frac{\omega L_2}{r_2+\Delta r_2}\times A'$$

$$e_{2'}=\frac{\omega M_{1'}}{\omega^2 L_{1'} C_{0'}}\times\frac{\omega L_{2'}}{r_{2'}}\times A'$$

Since $e_2=e_2'$, and since $M_1=M_1'$, $C_0=C_0'$, $L_1=L_1'$, $L_2=L_2'$ and $r_2=ra2'$ because both the circuits are completely similar to each other, we obtain the following equation:

$$\frac{1}{C_0}\left(1+\frac{\Delta C_1}{C_0}\right)\frac{1}{r_2}\left(1-\frac{\Delta r_2}{r_2}\right)=\frac{1}{C_0 r_2}$$

hence, $$\frac{1}{C_0 r_2}\left(\frac{\Delta C_1}{C_0}-\frac{\Delta r_2}{r_2}-\frac{\Delta C_1}{C_0}\times\frac{\Delta r_2}{r_2}\right)=0$$

Since $$\frac{\Delta C_1}{C_1}\leq 0.01$$

and $$\frac{\Delta r_2}{r_2}\leq 0.01,$$

we may neglect the third member in the parentheses in the above equation and obtain the following equation:

$$\frac{\Delta C_1}{C_0}=\frac{\Delta r_2}{r_2} \qquad (22)$$

Thus, $\Delta r_2$, hence $r_x$ can be sought from the equation (22) because $C_0$, $r_2$ and $\Delta C_1$ are known. It will be understood that $r_x$ is expressed as $$r_x=\frac{C_2^2}{C_x^2}\Delta r_2.$$

Since $\Delta C_1$ can precisely be measured from a change in indication in the dial graduations of the standard variable air capacitor, the value of $\Delta r_2$ can accurately be measured Alternatively, the output due to $\Delta r_2$ may be made zero by changing $C_0$ to $C_0-\Delta C_1'$ and $C_0'$ to $C_0+\Delta C_1'$ In this case, from the equations (20) and (21), we obtain $$\frac{\omega M_1}{\omega^2 L_1(C_0\cdot\Delta C_1)}\times\frac{\omega L_2}{r_2+\Delta r_2}\times A'=\frac{\omega M_{1'}}{\omega^2 L_{1'}(C_{0'}+\Delta C_{1'})}\times\frac{\omega L_{2'}}{r_{2'}}\times A'$$

hence, $$\left(1+\frac{\Delta C_{1'}}{C_0}\right)\left(1-\frac{\Delta r_2}{r_2}\right)=1-\frac{\Delta C_{1'}}{C_0}$$

and finally $$\frac{2\Delta C_{1'}}{C_0}=\frac{\Delta r_2}{r_2}$$

More precisely, the relation $\Delta C_1'=\frac{1}{2}\Delta C_1$ is obtained in this case. This second method is featured by the fact that the variation in the tuned state of the series tuning circuit due to $\Delta C_1$ is less than in the first method.

From the foregoing description, it will be understood that the present invention employs the zero method in which precisely variable air capacitors are manipulated for the precise measurement of resistance, and in the detecting section, a minute difference voltage is solely amplified for deflecting an indicating meter whereby to measure a very small loss.

What I claim is:

1. An apparatus for the precise measurement of very low dielectric losses of a dielectric specimen at high frequencies comprising:
   - a stabilized high frequency oscillator;
   - a tank circuit connected to said oscillator;
   - a resonant circuit electromagnetically coupled to said tank circuit, and having an inductor and two variable air capacitors of equal capacity all connected in series, said capacitors being grounded at their common connected ends;
   - first and second parallel tuned circuits having the same construction and circuit constants each having one end grounded and each being electrostatically coupled to said resonant circuit at the opposite ends of said grounded capacitors through very small capacitances of equal value;
   - a secondary detecting circuit coupled to said first and second parallel tuned circuits;
   - indicator means responsive to the vectorial addition of voltages of opposite phase in said detecting circuit for providing a manifestation of the resonance of said first and second tuned circuits;
   - and circuit means for connecting said specimen in parallel with said first parallel tuned circuit.

2. The apparatus according to claim 1, further comprising means for differentially varying the capacitances of resonant circuit.

3. The apparatus according to claim 1, in which said first and second parallel tuned circuits include respective variable capacitors grounded at their one ends.

4. The apparatus according to claim 1, in which said variable air capacitors are grounded at their rotors.

5. An apparatus for the precise measurement of very low dielectric losses of a dielectric specimen at high frequencies comprising:
   - a stabilized high frequency oscillator;
   - a tank circuit connected to said oscillator;
   - a resonant circuit having an inductor coupled to the coil of said tank circuit and first and second variable capacitors all connected in series, said first and second capacitors being grounded at their one ends and being of equal capacity;
   - first and second coils having the same construction and circuit constants connected in parallel with said first and second capacitors, the capacitances $C_1$ and $C_1'$ of said first and second capacitors and the inductances $L_1$ and $L_1'$ of said first and second coils having the relations of $\omega^2 L_1 C_1 > 1$ and $\omega^2 L_1' C_1' > 1$, where $\omega$ represents angle frequency, with said first and second variable capacitors being adjusted to maintain said series tuning circuit at resonance;

first and second tuned circuits each having the same construction and circuit constants, said first and second tuned circuits having third and fourth coils respectively, said third and fourth coils being electromagnetically coupled to said first and second coils with the same coupling respectively;

an indicating circuit having inductors electromagnetically coupled to said third and fourth coils and an indicating meter whose deflection is set at zero under normal conditions so that the output voltages from said first and second circuits in their tuned state are equal to each other;

and circuit means having test electrodes coupled to said first tuned circuit for connecting one specimen in parallel with the former;

whereby the loss and capacitance components of the specimen under test are derivable from a minute change in at least one of the series-connected capacitors when the output of said dectecting input due to the presence of the specimen is made zero.

6. The apparatus according to claim 5 which further comprises means for differentially varying the capacitances of said resonant circuit.

7. The apparatus according to claim 5 in which said first and second parallel tuning circuits includes respective variable capacitors grounded at their one ends.

8. The apparatus according to claim 5 in which said variable air capacitors are grounded at their rotors.